United States Patent
Zhao et al.

(10) Patent No.: US 12,445,251 B2
(45) Date of Patent: Oct. 14, 2025

(54) COMMUNICATION METHOD AND DEVICE, AND STORAGE MEDIUM

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 305 days.

(21) Appl. No.: 17/866,751

(22) Filed: Jul. 18, 2022

(65) Prior Publication Data
US 2022/0353045 A1    Nov. 3, 2022

Related U.S. Application Data

(63) Continuation of application No. PCT/CN2020/073046, filed on Jan. 19, 2020.

(51) Int. Cl.
| | |
|---|---|
| *H04L 5/00* | (2006.01) |
| *H04W 72/23* | (2023.01) |
| *H04W 92/18* | (2009.01) |

(52) U.S. Cl.
CPC .......... *H04L 5/0053* (2013.01); *H04W 72/23* (2023.01); *H04W 92/18* (2013.01)

(58) Field of Classification Search
None
See application file for complete search history.

(56) References Cited

U.S. PATENT DOCUMENTS

| | | | |
|---|---|---|---|
| 2010/0098043 A1 | 4/2010 | Hafeez | |
| 2020/0196293 A1* | 6/2020 | Liu | H04W 4/40 |

(Continued)

FOREIGN PATENT DOCUMENTS

| | | |
|---|---|---|
| CN | 103095433 A | 5/2013 |
| CN | 104080170 A | 10/2014 |

(Continued)

OTHER PUBLICATIONS

W. Wang, Z. Shi and Q. Zeng, âAn Improved Combined Component Aggregated HARQ A/N,â 2011 Third International Conference on Communications and Mobile Computing, Qingdao, China, 2011, pp. 417-419, doi: 10.1109/CMC.2011.105. (Year: 2011).*

(Continued)

*Primary Examiner* — Ayaz R Sheikh
*Assistant Examiner* — Christopher R Davis
(74) *Attorney, Agent, or Firm* — BAYES PLLC

(57) ABSTRACT

Provided are a communication method and device, and a storage medium. A first terminal device receives configuration information sent by a network device; the network device can configure, for the first terminal device and by means of the configuration information, a sidelink transmission resource and a transmission resource that corresponds to a PUCCH; the first terminal device may send, on the sidelink transmission resource configured by the network device, multiple pieces of sidelink data to a second terminal device, and receive, from the second terminal device, sidelink feedback information corresponding to the multiple pieces of sidelink data; the number of bits corresponding to the sidelink feedback information is greater than one; and when the first terminal device reports the sidelink feedback information to the network device by means of the transmission resource and is configured by the network device, (Continued)

one PUCCH can bear multi-bit sidelink feedback information.

17 Claims, 8 Drawing Sheets

(56) References Cited

U.S. PATENT DOCUMENTS

| | | | | |
|---|---|---|---|---|
| 2020/0336253 | A1* | 10/2020 | He | H04W 76/11 |
| 2021/0218511 | A1* | 7/2021 | Zhang | H04L 1/1854 |
| 2022/0085921 | A1* | 3/2022 | Zhang | H04L 5/0053 |
| 2023/0232422 | A1* | 7/2023 | Lee | H04L 5/0053 |
| | | | | 370/329 |

FOREIGN PATENT DOCUMENTS

| | | |
|---|---|---|
| CN | 108923894 A | 11/2018 |
| CN | 109792594 A | 5/2019 |
| CN | 110311762 A | 10/2019 |
| EP | 3905569 A1 | 11/2021 |
| WO | 2019019184 A1 | 1/2019 |
| WO | 2019113774 A1 | 6/2019 |

OTHER PUBLICATIONS

Wikipedia on Bit Field retrieved from https://en.wikipedia.org/w/index.php?title=Bit_field&oldid=927990333 (Year: 2020).*
First Office Action issued in corresponding European application No. 20914640.6, mailed Jul. 26, 2023.
Second Office Action issued in corresponding European application No. 20914640.6, mailed Jan. 31, 2024.
International Search Report from the International Searching Authority Re. Application No. PCT/CN2020/073046, mailed Oct. 21, 2020, 4 pages.
Written Opinion of the International Searching Authority Re. Application No. PCT/CN2020/073046, mailed Oct. 21, 2020, 9 pages.
Extended European Search Report issued in corresponding European application No. 20914640.6, mailed Dec. 19, 2022.
Vivo, "Discussion on mode 1 resource allocation mechanism", R1-1908149, 3GPP TSG RAN WG1 #98 Prague, CZ, Aug. 26-30, 2019.
First Examination Opinion Notice issued in corresponding Chinese Application No. 202210891892.3, mailed on Jun. 17, 2025, 16 pages.
Sidelink resource allocation mode 1, Agenda Item: 7.2.4.2.1, Source: Huawei, HiSilicon, 3GPP TSG RAN WG1 Meeting #98bis, R1-1910055, Chongqing, China, Oct. 14-20, 2019, 19 pages.

* cited by examiner

COMMUNICATION METHOD AND DEVICE, AND STORAGE MEDIUM

CROSS REFERENCE TO RELATED APPLICATION

The present application is a continuation of International Application No. PCT/CN2020/073046, filed on Jan. 19, 2020, which is incorporated herein by reference in its entirety.

TECHNICAL FIELD

Embodiments of the present disclosure relate to communication technologies, and in particular, to a communication method and device, and a storage medium.

BACKGROUND

In an Internet of Vehicles system, a network device may configure a sidelink transmission resource for a vehicle-mounted device, so that the vehicle-mounted device may use the sidelink transmission resource to send sidelink data to another vehicle-mounted device. The other vehicle-mounted device may also send sidelink feedback information to the vehicle-mounted device according to whether the sidelink data is successfully received. Then the vehicle-mounted device may also report the sidelink feedback information to a network device.

In the prior art, the vehicle-mounted device may report the sidelink feedback information to the network device through a Physical Uplink Control Channel (PUCCH), but there may be relatively large resource overhead of the PUCCH.

SUMMARY

Embodiments of the present disclosure provide a communication method and device, and a storage medium, so as to improve a utilization rate of a transmission resource corresponding to a PUCCH.

In a first aspect, embodiments of the present disclosure may provide a communication method. The method includes: receiving, by a first terminal device, configuration information sent by a network device, wherein the configuration information is used for configuring a sidelink transmission resource and a transmission resource corresponding to a Physical Uplink Control Channel (PUCCH); sending, by the first terminal device, multiple pieces of sidelink data to a second terminal device on the sidelink transmission resource; receiving, by the first terminal device, sidelink feedback information corresponding to the multiple pieces of sidelink data from the second terminal device; and sending, by the first terminal device, the sidelink feedback information to the network device, wherein the sidelink feedback information is carried by the PUCCH.

In a second aspect, embodiments of the present disclosure may provide a communication method. The method includes: sending, by a network device, configuration information to a first terminal device, wherein the configuration information is used for configuring a sidelink transmission resource and a transmission resource corresponding to a Physical Uplink Control Channel (PUCCH); receiving, by the network device, sidelink feedback information from the first terminal device, wherein the sidelink feedback information is carried by the PUCCH, and the sidelink feedback information is sidelink feedback information corresponding to multiple pieces of sidelink data sent by the first terminal device to a second terminal device on the sidelink transmission resource.

In a third aspect, embodiments of the present disclosure may provide a terminal device, including: a receiving module and a sending module.

The receiving module is configured to receive configuration information sent by a network device, wherein the configuration information is used for configuring a sidelink transmission resource and a transmission resource corresponding to a Physical Uplink Control Channel (PUCCH).

The sending module is configured to send multiple pieces of sidelink data to another terminal device on the sidelink transmission resource.

The receiving module is further configured to receive sidelink feedback information corresponding to the multiple pieces of sidelink data from the other terminal device.

The sending module is further configured to send the sidelink feedback information to the network device, wherein the sidelink feedback information is carried by the PUCCH.

In a fourth aspect, embodiments of the present disclosure may provide a network device, including: a sending module, configured to send configuration information to a first terminal device, wherein the configuration information is used for configuring a sidelink transmission resource and a transmission resource corresponding to a Physical Uplink Control Channel (PUCCH); and a receiving module, configured to receive sidelink feedback information from the first terminal device, wherein the sidelink feedback information is carried by the PUCCH, and the sidelink feedback information is sidelink feedback information corresponding to multiple pieces of sidelink data sent by the first terminal device to a second terminal device on the sidelink transmission resource.

In a fifth aspect, embodiments of the present disclosure may provide a terminal device, including: a processor, a memory and a communication interface. The memory is configured to store computer executable instructions. The processor is configured to execute the computer executable instructions stored in the memory to perform the method described in the first aspect.

In a sixth aspect, embodiments of the present disclosure may provide a network device, including: a processor, a memory and a communication interface. The memory is configured to store computer executable instructions. The processor is configured to execute the computer executable instructions stored in the memory to perform the method described in the second aspect.

In a seventh aspect, embodiments of the present disclosure provide a computer readable storage medium having computer executable instructions stored thereon, wherein the computer executable instructions are configured, when executed by a processor, to implement the method described in the first aspect or the second aspect.

In an eighth aspect, embodiments of the present disclosure provide a chip, including: a processor, configured to call and run a computer program from a memory, so that a device installed with the chip performs the method described in the first aspect or the second aspect.

In a ninth aspect, embodiments of the present disclosure provide a computer program product, including computer program instructions, wherein the computer program instructions cause a computer to perform the method described in the first aspect or the second aspect.

In a tenth aspect, embodiments of the present disclosure further provide a computer program, wherein the computer program causes a computer to perform the method described in the first aspect or the second aspect.

In the communication method and device, and the storage medium provided by embodiments of the present disclosure, the configuration information sent by the network device is received by the first terminal device, and the network device can configure the sidelink transmission resource and the transmission resource corresponding to the PUCCH for the first terminal device through the configuration information. The first terminal device can send the multiple pieces of sidelink data to the second terminal device on the sidelink transmission resource configured by the network device, and receive the sidelink feedback information corresponding to the multiple pieces of sidelink data from the second terminal device. The number of bits corresponding to the sidelink feedback information is greater than 1. When the first terminal device reports the sidelink feedback information to the network device through the transmission resource corresponding to the PUCCH configured by the network device, one PUCCH can be made to carry the multi-bit sidelink feedback information, thereby improving the utilization rate of the transmission resource corresponding to the PUCCH.

BRIEF DESCRIPTION OF THE DRAWINGS

In order to more clearly illustrate the technical solutions in embodiments of the present disclosure or prior arts, the drawings that need to be used in embodiments or prior arts are briefly described below. Apparently, the drawings described below are only some embodiments of the present disclosure. For a person skilled in the art, other drawings may be acquired from these drawings without creative effort.

DETAILED DESCRIPTION

Figure 1:
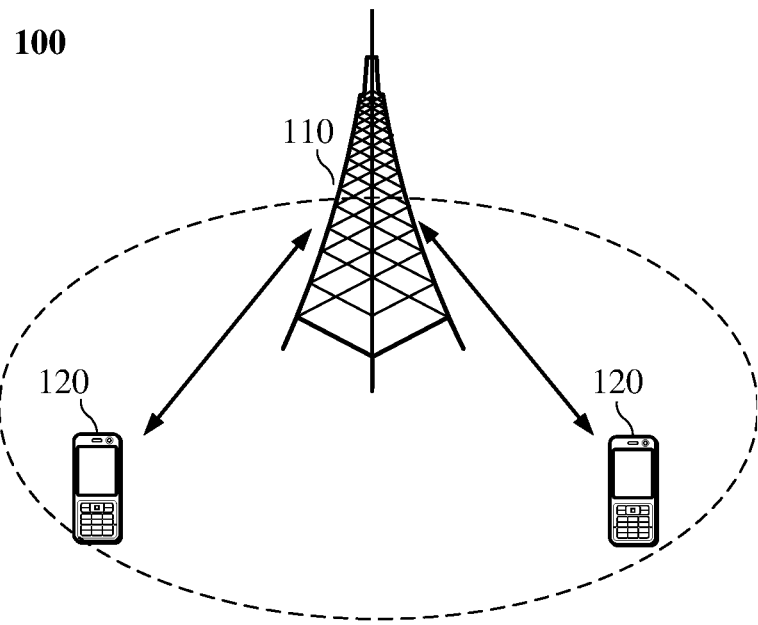
FIG. 1 is a schematic diagram of a communication system provided by the present disclosure.

In order to make purposes, technical solutions and advantages of embodiments of the present disclosure clearer, the technical solutions in embodiments of the present disclosure will be described clearly and completely in combination with the drawings of embodiments of the present disclosure. Obviously, the described embodiments are parts of embodiments of the present disclosure, but not all of the embodiments. Based on embodiments of the present disclosure, all other embodiments obtained by those of ordinary skill in the art without creative work shall fall within a protection scope of the present disclosure.

The terms "first", "second" and so forth in the description, claims, and the foregoing drawings of embodiments of the present disclosure are used to distinguish similar objects, and are not necessarily used to describe a specific order or sequence. It should be understood that data used in this way may be interchanged under appropriate circumstances, so that embodiments of the present disclosure described herein may be implemented in a sequence other than those, for example, as illustrated or described herein. In addition, the terms "including" and "having" and any variations of them are intended to cover non-exclusive inclusions. For example, a process, method, system, product or device that includes a series of steps or units is not necessarily limited to the steps or units clearly listed, but includes other steps or units that are not clearly listed or other steps or units which are inherent to the process, method, product, or device.

The technical solutions in embodiments of the present disclosure will be described below in combination with the drawings of embodiments of the present disclosure. Obviously, the described embodiments are parts of embodiments of the present disclosure, not all of the embodiments. Based on embodiments of the present disclosure, all other embodiments obtained by those of ordinary skill in the art without creative work shall fall within a protection scope of the present disclosure.

The technical solutions of embodiments of the present disclosure may be applied to various communication systems, such as Global System of Mobile Communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Advanced Long Term Evolution (LTE-A) system, New Radio (NR) system, NR system evolution system, LTE-based access to unlicensed spectrum (LTE-U) system, NR-based access to unlicensed spectrum (NR-U) system, Universal Mobile Telecommunication System (UMTS), Worldwide Interoperability For Microwave Access (WiMAX) communication systems, Wireless Local Area Networks (WLAN), Wireless Fidelity (WiFi), next-generation communication systems or other communication systems, etc.

Generally speaking, traditional communication systems support a limited number of connections and are easy to implement. However, with the development of communication technology, mobile communication systems will not only support traditional communications, but will also support, for example, device to device (D2D) communication, machine to machine (M2M) communication, machine type communication (MTC), vehicle to vehicle (V2V) communication and so forth. Embodiments of the present disclosure may also be applied to these communications system.

Exemplarily, a communication system 100 applied in an embodiment of the present disclosure is shown in FIG. 1. The communication system 100 may include a network device 110, and the network device 110 may be devices in communication with a terminal device 120 (or called a communication terminal or terminal). The network device 110 may provide communication coverage for a specific geographic area, and may communicate with terminal devices located within the coverage area. In an implementation, the network device 110 may be a Base Transceiver Station (BTS) in a GSM system or a CDMA system, a NodeB (NB) in a WCDMA system, an evolutional Node B (eNB or eNodeB) in an LTE system or a wireless controller in a Cloud Radio Access Network (CRAN). Alternatively, the network device may be a mobile switching center, a relay station, an access point, a vehicle-mounted device, a wearable device, a hub, a switch, a bridge, a router, a network side device in the 5G network or in a Public Land Mobile Network (PLMN) of future evolution and so forth.

The communication system 100 further includes at least one terminal device 120 located within a coverage of the network device 110. As the "terminal device" used herein, it includes, but is not limited to, connection via wired lines, such as connection via Public Switched Telephone Networks (PSTN), Digital Subscriber Line (DSL), digital cables and direct cable; and/or via another data connection/network; and/or via wireless interfaces, such as cellular networks, Wireless Local Area Networks (WLAN), digital TV networks (e.g., DVB-H networks), satellite networks and AM-FM broadcast transmitter; and/or another apparatus of other terminal device that is set to receive/send communication signals; and/or internet of things (IoT) devices. A terminal device set to communicate through a wireless interface may be referred to as a "wireless communication terminal", a "wireless terminal" or a "mobile terminal". Examples of mobile terminals include, but are not limited to, satellite or cellular phones; Personal Communications System (PCS) terminals that may combine cellular radio phones with data processing, fax and data communication capabilities. This may include radio phones, pagers, Internet/intranet access, Web browser, memo pad, calendar, and/or Personal Digital Assistants (PDA) devices of a Global Positioning System (GPS) receiver; as well as conventional laptop and/or palmtop receivers or others electronic devices including radio telephone transceivers. The terminal device may refer to access terminals, User Equipment (UE), user units, user stations, mobile stations, mobile platforms, remote stations, remote terminals, mobile devices, user terminals, terminals, wireless communication devices, user agents, or user apparatus. The access terminal may be cellular phones, cordless phones, Session Initiation Protocol (SIP) phones, Wireless Local Loop (WLL) stations, PAD devices, handheld devices with wireless communication function, computing devices or other processing devices connected to wireless modems, vehicle-mounted devices, wearable devices, terminal devices in 5G networks, or terminal devices in the future evolution of PLMN and so forth.

In an implementation, a Device To Device (D2D) communication may be performed between the terminal devices 120.

In an implementation, a 5G system may be also referred to as a new radio (NR) system, or 5G network may also be referred to as a NR network.

FIG. 1 exemplarily shows one network device and two terminal devices. In an implementation, the communication system 100 may include multiple network devices and other numbers of terminal devices may be located within the coverage of each network device, which are not limited in embodiments of the present disclosure.

In FIG. 1, the network device may be the access device. For example, it may be the access device in an NR-U system, such as a next generation Node B (gNB) in 5G, a small station or a micro station. Alternatively, it may also be a relay station, a Transmission and Reception Point (TRP), a Road Side Unit (RSU) and so forth.

The terminal device may also be referred to as the mobile terminal, the UE, the access terminal, the user unit, the user station, the mobile station, the mobile platform, the user terminal, the terminal, the wireless communication device, the user agent or the user apparatus. Specifically, it may be a smart phone, the cellular phone, the cordless phone, the PDA device, the handheld device with wireless communication function or other processing devices connected to the wireless modem, the vehicle-mounted device, the wearable device and so forth. In an embodiment of the present disclosure, the terminal device has an interface for communicating with the network device (for example, the cellular network).

In an implementation, the communication system 100 may also include other network entities such as a network controller and a mobility management entity, which are not limited in embodiments of the present disclosure.

It should be understood that the device with a communication function in the network and/or system according to embodiments of the present disclosure may be referred to as the communication device. Taking the communication system 100 shown in FIG. 1 as an example, the communication device may include a network device 110 and a terminal device 120 which have the communication function. The network device 110 and the terminal device 120 may be the specific devices as described above, which will not be repeated here. The communication device may also include other devices in the communication system 100, such as a network controller, a mobility management entity, and other network entities, which are not limited in embodiments of the present disclosure.

It should be understood that the terms "system" and "network" herein are often used interchangeably herein. The term "and/or" herein is only an association relationship describing associated objects, which means that there may be three kinds of relationships. For example, the expression of A and/or B may mean three cases that: A alone exists, A and B exist at the same time, and B alone exists. In addition, the character "/" herein generally indicates that the associated objects before and after the character are in an "or" relationship.

Figure 2:
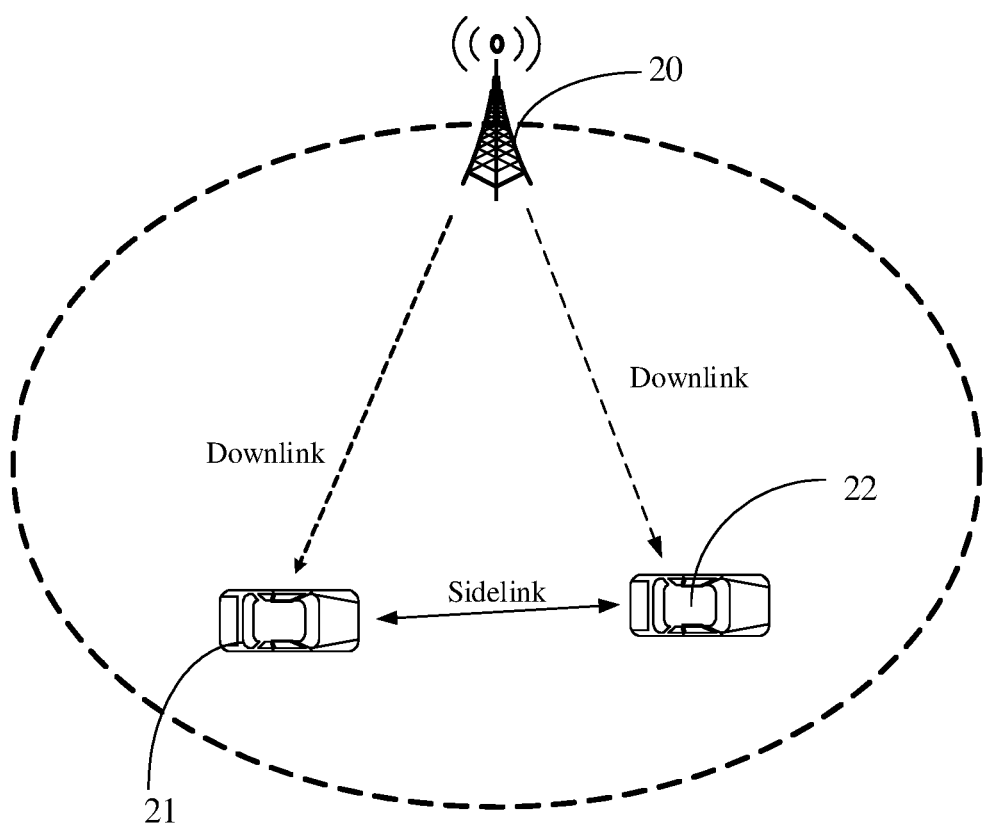
FIG. 2 is a schematic diagram of a sidelink transmission in the prior art.
Figure 3:
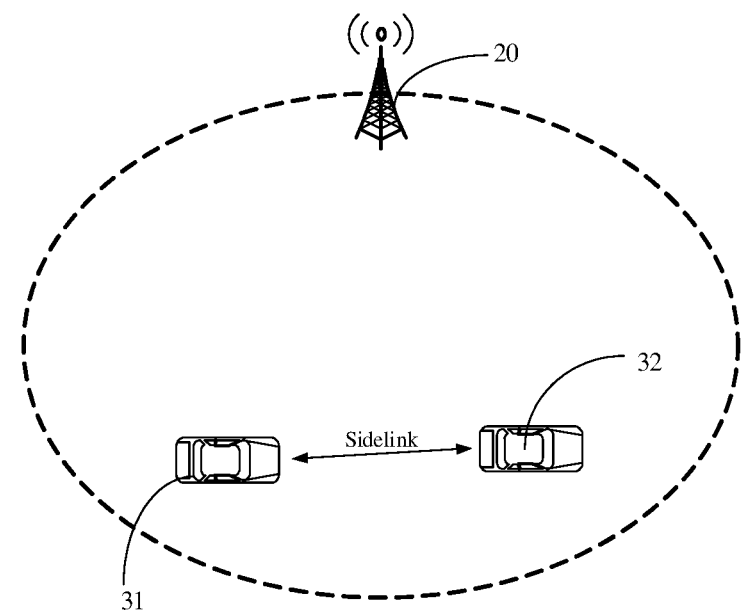
FIG. 3 is a schematic diagram of another sidelink transmission in the prior art.

The method in embodiments of the present disclosure may be applied to the communication system as shown in FIG. 1, and may also be applied to other communication scenarios. D2D is a sidelink (SL) transmission technology, which may be applied in an Internet of Vehicles system. In addition, Vehicle to Everything (V2X) may also be applied in the Internet of Vehicles system. Specifically, in the Internet of Vehicles system, there are two transmission modes between terminal devices. A first mode may be a mode shown in FIG. 2, and the network device such as a base station 20 allocates sidelink transmission resources to a terminal device A in a vehicle 21 and/or a terminal device B in a vehicle 22 through a downlink, respectively. Specifically, the base station 20 may configure a sidelink transmission resource for a single transmission to the terminal device, and may also configure a semi-static sidelink transmission resource for the terminal device. The terminal device A and the terminal device B transmit sidelink data on the sidelink according to the sidelink transmission resources allocated by the base station 20, wherein the terminal device in the vehicle may specifically be a vehicle-mounted device. A second mode may be a mode shown in FIG. 3. A terminal device C in a vehicle 31 selects a sidelink transmission resource from a resource pool, and sends the sidelink data to a terminal device D in a vehicle 32 according to the sidelink transmission resource. The first mode is taken as example for illustrative description below.

In NR-V2X, the terminal device may use the sidelink transmission resource for unicast, multicast and broadcast transmission.

Figure 4:
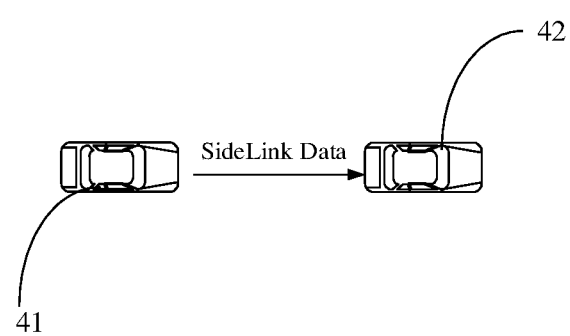
FIG. 4 is a schematic diagram of a unicast in the prior art.

For the unicast transmission, a reception end is one terminal device. As shown in FIG. 4, a first terminal device in a vehicle 41 sends the sidelink data to a second terminal device in a vehicle 42.

Figure 5:
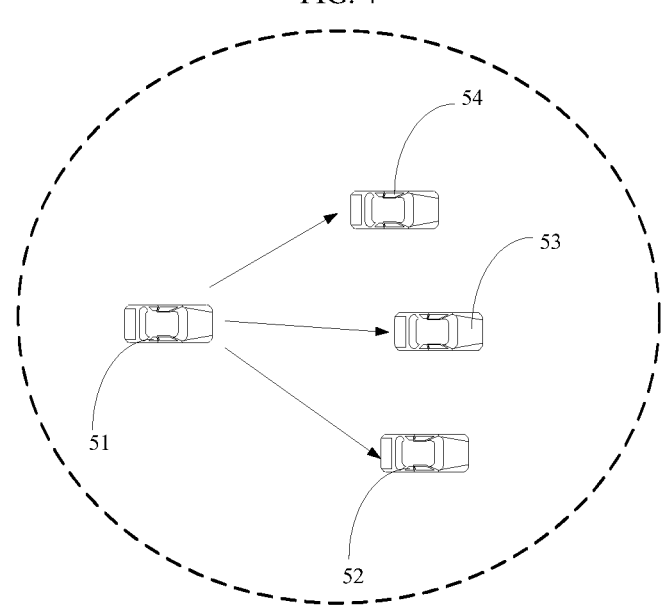
FIG. 5 is a schematic diagram of a multicast in the prior art.

For the multicast transmission, the reception end is multiple terminal devices in one multicast group. As shown in FIG. 5, terminal devices respectively included in a vehicle 51, a vehicle 52, a vehicle 53 and a vehicle 54 constitute one multicast group. When the terminal device included in the vehicle 51 sends the sidelink data, the terminal devices respectively included in the vehicle 52, the vehicle 53 and the vehicle 54 may receive the sidelink data.

Figure 6:
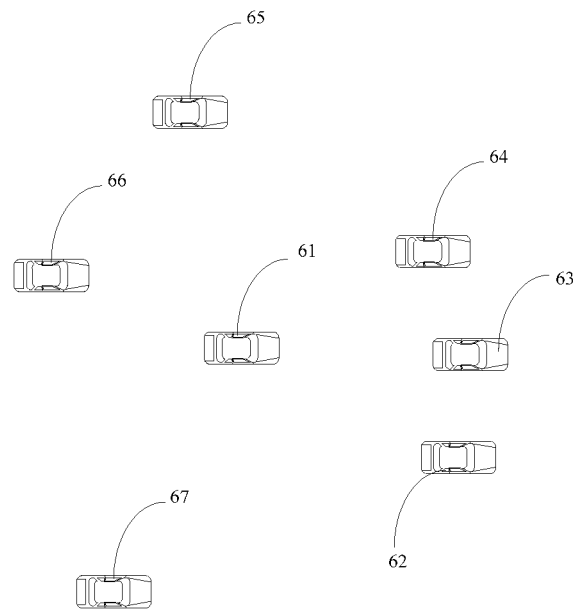
FIG. 6 is a schematic diagram of a broadcast in the prior art.

For the broadcast transmission, the reception end may be any terminal device. As shown in FIG. 6, when a terminal device included in a vehicle 61 sends the sidelink data, other terminal devices around the vehicle 61, such as terminal devices respectively included in a vehicle 62, a vehicle 63, a vehicle 64, a vehicle 65, a vehicle 66 and a vehicle 67 may all receive the sidelink data.

Figure 7:
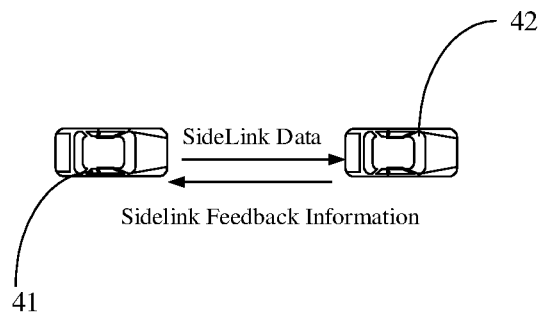
FIG. 7 is a schematic diagram of a sidelink feedback in the prior art.

Embodiments of the present disclosure take the unicast as an example for illustrative description. For example, on the basis of FIG. 4, after the first terminal device in the vehicle 41 sends the sidelink data to the second terminal device in the vehicle 42, the second terminal device may also send sidelink feedback information to the first terminal device. As shown in FIG. 7, the sidelink feedback information is used to indicate whether the second terminal device successfully receives the sidelink data. Specifically, the sidelink feedback information may be carried on a sidelink feedback channel, which may be a Physical Sidelink Feedback Channel (PSFCH). The sidelink feedback information may be Hybrid Automatic Repeat request (HARQ) feedback information. The first terminal device may determine whether to retransmit the sidelink data to the second terminal device according to the HARQ feedback information. In some cases, the sidelink feedback may also be activated or deactivated. For example, when the sidelink feedback is activated, the reception end sends the sidelink feedback information to the sending end after receiving the sidelink data. If the sidelink feedback is deactivated, and after receiving the sidelink data, the reception end does not need to send the sidelink feedback information to the sending end, but the sending end may retransmit the data in a blind retransmission way. For example, the sending end may repeatedly send each piece of sidelink data K times, instead of determining whether the data needs to be retransmitted according to the sidelink feedback information sent by the reception end.

Figure 8:
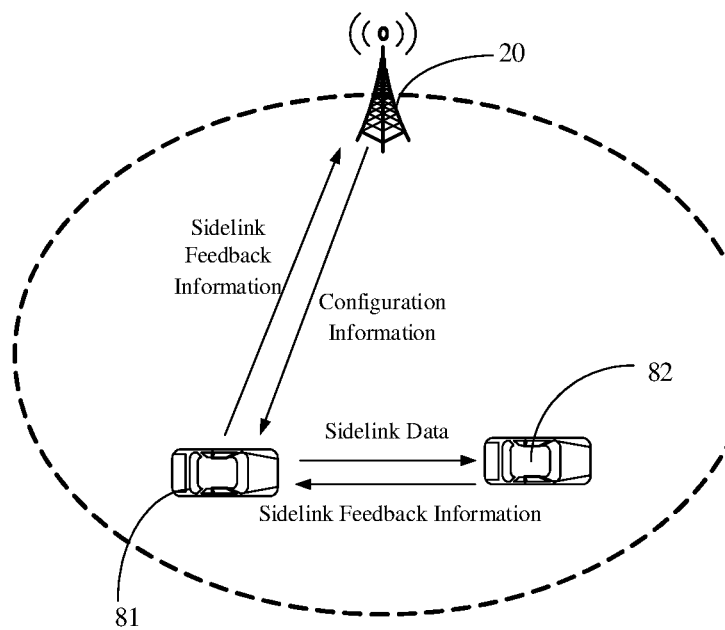
FIG. 8 is a schematic diagram of an application scenario provided by the present disclosure.

It may be understood that, since the sidelink transmission resource is configured for the terminal device by the network device in the first mode described above, when the terminal device retransmits the sidelink data, the network device also needs to configure the terminal device with the sidelink transmission resource required for sidelink data retransmission, that is, a retransmission resource. Therefore, the sending end may report the sidelink feedback information sent by the reception end to the network device, so that the network device may determine whether to configure the retransmission resource for the sending end according to the sidelink feedback information reported by the sending end. For example, as shown in FIG. 8, a first terminal device included in a vehicle 81 is the sending end, a second terminal device included in a vehicle 82 is the reception end, and a network device 20 sends configuration information to the first terminal device. The configuration information may be used to configure the sidelink transmission resource and a transmission resource corresponding to the PUCCH for the first terminal device. Specifically, the sidelink transmission resource may be a transmission resource corresponding to a Physical Sidelink Shared Channel (PSSCH). Specifically, the first terminal device sends the sidelink data to the second terminal device on a transmission resource corresponding to the PSSCH, and the second terminal device sends the sidelink feedback information to the first terminal device through the PSFCH. The sidelink feedback information is used to indicate whether the sidelink data is properly received by the second terminal device. Further, the first terminal device may carry the sidelink feedback information in the PUCCH, and report the sidelink feedback information to the network device 20 through the PUCCH. The network device 20 determines whether to allocate the retransmission resource to the first terminal device according to the sidelink feedback information. However, PUCCH may be only used to carry 1-bit sidelink feedback information. When the number of pieces of sidelink feedback information is large, or the number of bits occupied by the sidelink feedback information is large, multiple PUCCHs are required to carry the 1-bit sidelink feedback information, respectively, thereby causing the transmission resource corresponding to the PUCCH to be wasted. In order to solve this problem, embodiments provide a communication method, which is described below with reference to specific embodiments.

Figure 9:
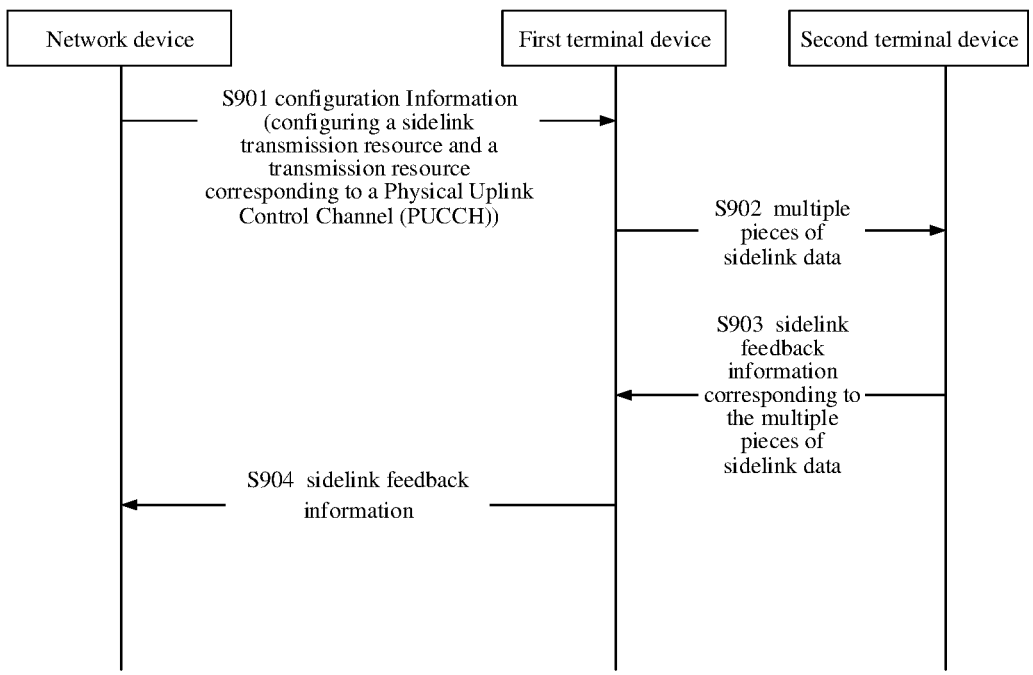
FIG. 9 is a flowchart of a communication method provided by the present disclosure.

FIG. 9 is a flowchart of a communication method provided by the present disclosure. As shown in FIG. 9, the communication method includes the following steps S901-S904.

In step S901, a network device sends configuration information to a first terminal device. Accordingly, the first terminal device receives the configuration information sent by the network device. The configuration information is used to configure a sidelink transmission resource and a transmission resource corresponding to a Physical Uplink Control Channel (PUCCH).

In embodiments of the present disclosure, the network device may configure the sidelink transmission resource for the first terminal device in a Dynamic Scheduling (DG) mode, or the network device may configure the sidelink transmission resource for the first terminal device in a Configured Grant (CG) mode.

In the DG mode, the first terminal device needs to send a Scheduling Request (SR) or a Buffer Status Report (BSR) to the network device, so as to request the network device to configure the sidelink transmission resource for the first terminal device. In the DG mode, the network device may configure the sidelink transmission resource and the transmission resource corresponding to the PUCCH for the first terminal device through Downlink Control Information (DCI).

The CG mode may be used as a semi-static configuration mode. Specifically, the CG mode may include two configured grant modes: type-1 configured grant and type-2 configured grant.

In the type-1 configured grant, the network device may configure the sidelink transmission resource for the first terminal device through Radio Resource Control (RRC) signaling. Specifically, the RRC signaling may be used to configure a time domain resource and a frequency domain resource of the sidelink transmission resource. In addition, the RRC signaling may also be used to configure a Demodulation Reference Signal (DMRS), Modulation and Coding Scheme (MCS), etc. In addition, the RRC signaling may also be used to configure the transmission resource corresponding to the PUCCH. After receiving the RRC signaling, the first terminal device may perform sidelink transmission according to the sidelink transmission resource configured by the RRC signaling.

In the type-2 configured grant, the network device configures the sidelink transmission resource for the first terminal device in two steps. Specifically, the network device first sends the RRC signaling to the first terminal device, and the RRC signaling may include the period of a time-frequency resource, a redundancy version, the number of retransmissions, the number of HARQ processes, etc. Further, the network device sends DCI to the first terminal device, and the DCI may activate the sidelink transmission resource and may be used to configure the time domain resource, the frequency domain resource, MCS, etc. of the sidelink transmission resource. That is to say, when receiving the RRC signaling, the first terminal device cannot perform the sidelink transmission immediately, and the first terminal device needs to wait until it receives the respective DCI for activating the sidelink transmission resource and configuring the respective sidelink transmission resource before the sidelink transmission may be performed. In addition, the DCI may also be used to deactivate the sidelink transmission resource. For example, when the sidelink transmission resource is deactivated, the first terminal device cannot use the sidelink transmission resource for sidelink transmission. In addition, the DCI may also be used to configure the transmission resource corresponding to the PUCCH.

A difference between the CG mode and the DG mode is that if the network device uses the CG mode to configure the sidelink transmission resource for the first terminal device, the sidelink transmission resource is also called a sidelink Configured Grant (SL CG) transmission resource in this case. When the first terminal device has the sidelink data that needs to be transmitted, it may directly use the sidelink transmission resource for transmission, without sending SR or BSR to the network device to request the sidelink transmission resource.

It can be seen that, in the DG mode, the configuration information sent by the network device to the first terminal device is specifically the DCI. In the type-1 configured grant of the CG mode, the configuration information sent by the network device to the first terminal device is specifically the RRC signaling. In the type-2 configured grant of the CG mode, the configuration information sent by the network device to the first terminal device is specifically the DCI.

In embodiments of the present disclosure, the network device may configure the sidelink transmission resource for the first terminal device in the DG mode and/or the CG mode.

In step S902, the first terminal device sends multiple pieces of sidelink data to a second terminal device on the sidelink transmission resource.

In step S903, the first terminal device receives sidelink feedback information corresponding to the multiple pieces of sidelink data from the second terminal device.

In step S904, the first terminal device sends the sidelink feedback information to the network device, and the sidelink feedback information is carried by the PUCCH. Accordingly, the network device receives the sidelink feedback information carried in the PUCCH and sent by the first terminal device.

In the following, the first terminal device described in steps S901-S904 is, for example, the first terminal device included in the vehicle 81 as shown in FIG. 8, and the second terminal device is, for example, the second terminal device included in the vehicle 82 as shown in FIG. 8.

In a possible implementation, the network device may configure one sidelink transmission resource and a transmission resource corresponding to one PUCCH for the first terminal device in the DG mode or the CG mode. Specifically, if the network device configures the one sidelink transmission resource and the transmission resource corresponding to the one PUCCH for the first terminal device in the mode manner, the one sidelink transmission resource and the transmission resource corresponding to the one PUCCH may be resources in one SL CG period. The sidelink transmission resource may be a transmission resource corresponding to the PSSCH. One PSSCH is used to transmit one piece of sidelink data, and one piece of sidelink data may include multiple Transmission Blocks (TBs). For example, one piece of sidelink data includes two TBs. Specifically, the first terminal device may send one piece of sidelink data carried by one PSSCH to the second terminal device included in the vehicle 82 as shown in FIG. 8 through the PSSCH. If the second terminal device performs feedback based on the TB, one piece of sidelink data corresponds to 2-bit sidelink feedback information, and the second terminal device sends the 2-bit sidelink feedback information to the first terminal device. After receiving the 2-bit sidelink feedback information, the first terminal device may enable the 2-bit sidelink feedback information to be carried in the PUCCH configured by the network device for the first terminal device, and report the 2-bit sidelink feedback information to the network device through the PUCCH. In other cases, one TB may also include multiple Code Block Groups (CBGs). For example, one TB may include four CBGs. If one PSSCH is used to transmit one piece of sidelink data, and one piece of sidelink data includes two TBs, then one PSSCH may carry eight CBGs. If the second terminal device performs feedback based on the CBG, the second terminal device sends 8-bit sidelink feedback information to the first terminal device. Similarly, the first terminal device reports the 8-bit sidelink feedback information to the network device through the PUCCH.

Figure 10:
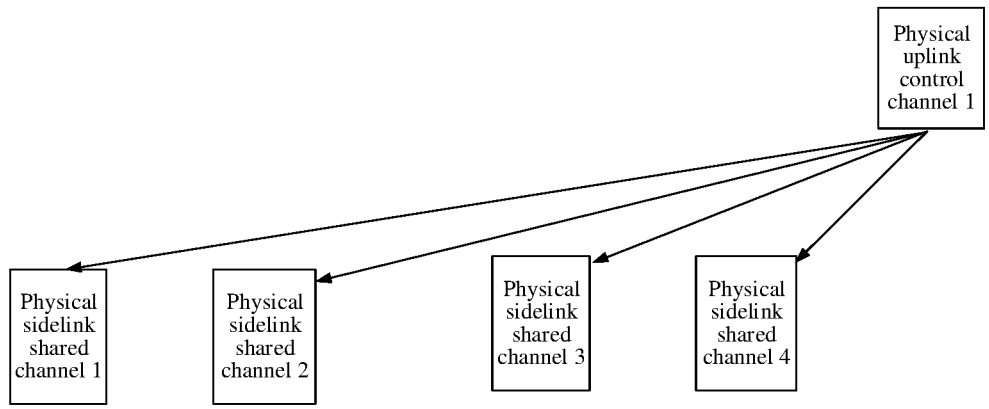
FIG. 10 is a schematic diagram of a sidelink transmission resource provided by the present disclosure.

In another possible implementation, the network device may configure multiple sidelink transmission resources and the transmission resource corresponding to one PUCCH for the first terminal device. For example, as shown in FIG. 10, the network device configures a transmission resource corresponding to PSSCH1 and a transmission resource corresponding to PUCCH for the first terminal device through DCI1, configures a transmission resource corresponding to PSSCH2 and a transmission resource corresponding to the PUCCH for the first terminal device through DCI2, configures a transmission resource corresponding to PSSCH3 and a transmission resource corresponding to the PUCCH for the first terminal device through DCI3, and configures a transmission resource corresponding to PSSCH4 and a transmission resource corresponding to the PUCCH for the first terminal device through DCI4. Each DCI in DCI1, DCI2, DCI3 and DCI4 may specifically be the configuration information in the DG mode or the configuration information in the CG mode. The transmission resources corresponding to the PUCCHs respectively configured by DCI1, DCI2, DCI3, and DCI4 overlap in a time domain, or are in the same slot. In this case, it may be determined that DCI1, DCI2, DCI3, and DCI4 point to the same PUCCH, for example, PUCCH1. Or, it may be determined that one PUCCH is used to carry the sidelink feedback information corresponding to the sidelink data sent by the four PSSCH channels. Further, the first terminal device sends different sidelink data to the second terminal device in a time division way through PSSCH1, PSSCH2, PSSCH3, and PSSCH4. For example, the first terminal device sends sidelink data 1 to the second terminal device through PSSCH1, and the second terminal device sends sidelink feedback information 1 corresponding to the sidelink data 1 to the first terminal device. Similarly, the first terminal device sends sidelink data 2 to the second terminal device through PSSCH2, and the second terminal device sends sidelink feedback information 2 corresponding to the sidelink data 2 to the first terminal device. The first terminal device sends sidelink data 3 to the second terminal device through PSSCH3, and the second terminal device sends sidelink feedback information 3 corresponding to the sidelink data 3 to the first terminal device. The first terminal device sends sidelink data 4 to the second terminal device through PSSCH4, and the second terminal device sends sidelink feedback information 4 corresponding to the sidelink data 4 to the first terminal device. The sidelink data 1, the sidelink data 2, the sidelink data 3, and the sidelink data 4 may be four pieces of different sidelink data. Further, the first terminal device carries the sidelink feedback information 1, the sidelink feedback information 2, the sidelink feedback information 3, and the sidelink feedback information 4 in PUCCH1. If each piece of sidelink feedback information corresponds to one bit, then PUCCH1 may carry 4-bit sidelink feedback information. The first terminal device reports the 4-bit sidelink feedback information to the network device through PUCCH1.

In still another possible implementation, one piece of configuration information may configure multiple sidelink transmission resources and the transmission resource corresponding to one PUCCH. For example, transmission resources corresponding to PSSCH1, PSSCH2, and PSSCH3 shown in FIG. 10 may be configured by DCI1, and the transmission resource corresponding to PSSCH4 may be configured by DCI2. PSSCH1, PSSCH2, and PSSCH3 may be used to send the sidelink data 1, and PSSCH4 may be used to send the sidelink data 2. For example, the first terminal device sends the sidelink data 1 to the second terminal device for the first time through PSSCH1, but the second terminal device may not successfully receive the sidelink data 1. Then, the sidelink feedback information fed back by the second terminal device to the first terminal device is specifically Negative Acknowledgement (NACK) information. Further, the first terminal device retransmits the sidelink data 1 to the second terminal device once through PSSCH2. If the sidelink feedback information corresponding to the sidelink data 1 is still the NACK information after retransmission, the first terminal device may retransmit the sidelink data 1 to the second terminal device again through PSSCH3. After this retransmission, the sidelink feedback information corresponding to the sidelink data 1 is, for example, Acknowledgement (ACK) information. The first terminal device may carry the last sidelink feedback information corresponding to the sidelink data 1 in PUCCH1. Further, the first terminal device sends the sidelink data 2 to the second terminal device through PSSCH4, and receives the sidelink feedback information corresponding to the sidelink data 2, as well as carries the sidelink feedback information corresponding to the sidelink data 2 in PUCCH1. In this way, PUCCH1 may carry the sidelink feedback information corresponding to multiple pieces of different sidelink data.

Figure 11:
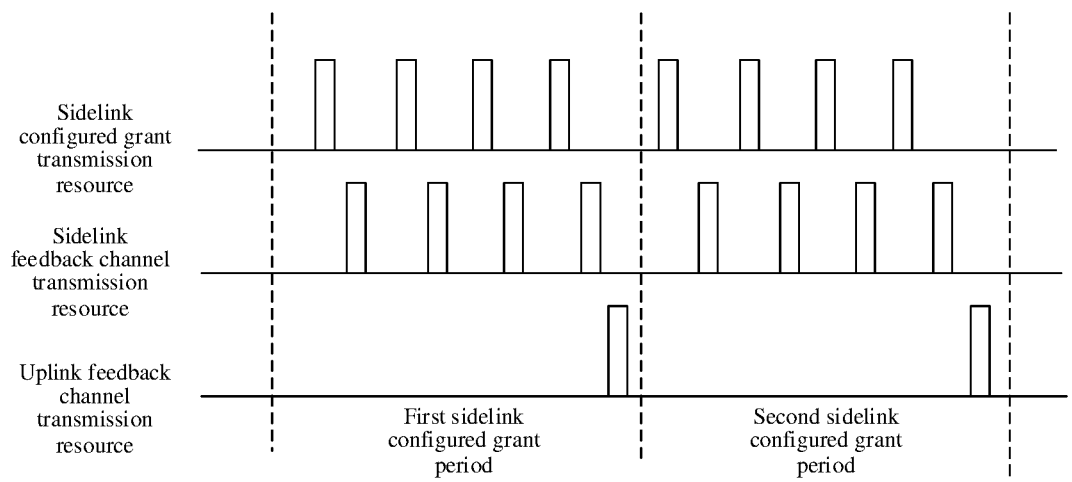
FIG. 11 is a schematic diagram of another sidelink transmission resource provided by the present disclosure.

In still another possible implementation, multiple sidelink transmission resources within one SL CG period may be configured by the network device for the first terminal device in the CG mode. As shown in FIG. 11, there are four sidelink configured grant transmission resources, four sidelink feedback channel transmission resources, and one uplink feedback channel transmission resource in one SL CG period. The four sidelink configured grant transmission resources may be specifically transmission resources corresponding to four PSSCHs. The four sidelink feedback channel transmission resources may be specifically transmission resources corresponding to four PSFCHs. The one uplink feedback channel transmission resource may be specifically a transmission resource corresponding to 1 PUCCH. In an implementation, in one SL CG period, one PUCCH resource is subsequent to the last PSFCH resource. For example, the first terminal device may use four PSSCH resources in one SL CG period to send four pieces of different sidelink data to the second terminal device. One PSSCH carries one piece of sidelink data. The second terminal device uses four PSFCH resources to send the sidelink feedback information corresponding to the four pieces of sidelink data to the first terminal device, respectively. One PSFCH carries one piece of sidelink feedback information. In this way, within one SL CG period, the first terminal device may receive four pieces of sidelink feedback information. If one piece of sidelink feedback information corresponds to one bit, the first terminal device may carry 4-bit sidelink feedback information in the PUCCH resource within the SL CG period, and report the 4-bit sidelink feedback information to the network device through the PUCCH.

In the communication method provided by embodiments of the present disclosure, the configuration information sent by the network device is received by the first terminal device, and the network device may configure the sidelink transmission resource and the transmission resource corresponding to the PUCCH for the first terminal device through the configuration information. The first terminal device may send multiple pieces of sidelink data to the second terminal device on the sidelink transmission resource configured by the network device, and receive the sidelink feedback information corresponding to the multiple pieces of sidelink data from the second terminal device. The number of bits corresponding to the sidelink feedback information is greater than 1. When the first terminal device reports the sidelink feedback information to the network device through the transmission resource corresponding to the PUCCH configured by the network device, one PUCCH may be made to carry the multi-bit sidelink feedback information, thereby improving the utilization rate of the transmission resource corresponding to the PUCCH.

Figure 12:
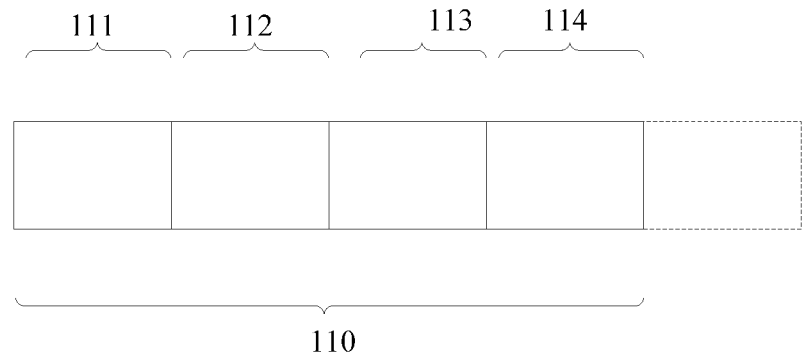
FIG. 12 is a schematic diagram of a first feedback information field provided by the present disclosure.

On the basis of the above embodiments, information carried by the PUCCH may include a first feedback information field, and the first feedback information field is used to carry the sidelink feedback information corresponding to the sidelink data. Specifically, the first feedback information field may include one or more subfields. As shown in FIG. 12, 110 denotes the first feedback information field, and the first feedback information field may include one or more subfields. For example, 111 denotes any subfield in the first feedback information field. In addition, on the basis of FIG. 12, the PUCCH may also include other information fields, such as an information field shown by the dotted box, which may be used to carry other feedback information except the sidelink feedback information, and specific contents carried thereby will be introduced in subsequent embodiments. In addition, embodiments of the present disclosure does not limit a positional relationship between the information field shown by the dotted box and the first feedback information field.

In order to distinguish the sidelink transmission resources configured by the network device for the first terminal device in the DG mode or the CG mode, a sidelink transmission resource configured by the network device for the first terminal device in the DG mode may be denoted as a first sidelink transmission resource, and a sidelink transmission resource within one SL CG period configured by the network device for the first terminal device in the CG mode is denoted as a second sidelink transmission resource. The sidelink transmission resources configured by the network device for the first terminal device include the first sidelink transmission resource and/or the second sidelink transmission resource.

In a possible implementation, the multiple sidelink transmission resources configured by the network device for the first terminal device are respectively the first sidelink transmission resources. The first feedback information field includes a second feedback information field, and the second feedback information field is used to carry sidelink feedback information corresponding to the sidelink data sent by the first terminal device using the first sidelink transmission resource. As shown in FIG. 10, PSSCH1, PSSCH2, PSSCH3, and PSSCH4 are the sidelink transmission resources configured by the network device for the first terminal device in the DG mode, respectively. The sidelink feedback information corresponding to PSSCH1 may be carried in the subfield 111, the sidelink feedback information corresponding to PSSCH2 may be carried in the subfield 112, the sidelink feedback information corresponding to PSSCH3 may be carried in the subfield 113, and the sidelink feedback information corresponding to PSSCH4 may be carried in the subfield 114. The subfield 111, the subfield 112, the subfield 113, and the subfield 114 constitute the second feedback information field. The number of bits corresponding to each subfield is determined according to at least one of the maximum number A of TBs carried by the PSSCH and the maximum number B of CBGs included in one TB, where A and B may be configured by the network device or pre-configured. Optionally, A and B are resource pool configuration parameters. That is, different resource pools may be configured with different values for A and B. For example, in a TB-based feedback mode, if one PSSCH carries A=2 TBs, then one subfield corresponds to two bits; and if one PSSCH carries A=1 TB, then one subfield corresponds to one bit. In a CBG-based feedback mode, if one PSSCH carries A=1 TB, and one TB includes B=4 CBGs, then one subfield corresponds to four bits; and if one PSSCH carries A=2 TBs and one TB includes B=4 CBGs, then one subfield corresponds to eight bits.

Figure 13:
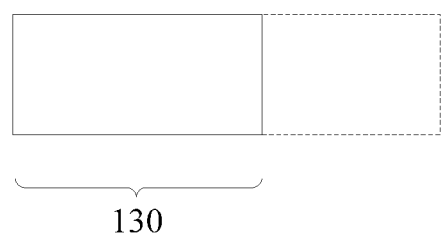
FIG. 13 is a schematic diagram of another first feedback information field provided by the present disclosure.

In another possible implementation, the multiple sidelink transmission resources configured by the network device for the first terminal device are respectively the second sidelink transmission resources, the first feedback information field includes a third feedback information field, and the third feedback information field is used to carry sidelink feedback information corresponding to the sidelink data sent by the first terminal device using the second sidelink transmission resource. For example, when there are multiple sidelink transmission resources within one SL CG period configured by the network device for the first terminal device in the CG mode, the first feedback information field may include one subfield. As shown in FIG. 13, 130 denotes one subfield included in the first feedback information field. In this case, the subfield 130 may be denoted as the third feedback information field, and this subfield is used to carry the sidelink feedback information corresponding to the multiple sidelink transmission resources within one SL CG period configured by the network device for the first terminal device in the CG mode. For example, as shown in FIG. 11, there are four PSSCH resources included within one SL CG period. If each PSSCH resource carries one piece of different sidelink data, the first terminal device may receive four pieces of sidelink feedback information. If one piece of sidelink feedback information corresponds to one bit, the first terminal device may carry the 4-bit sidelink feedback information in the third feedback information field 130.

Figure 14:
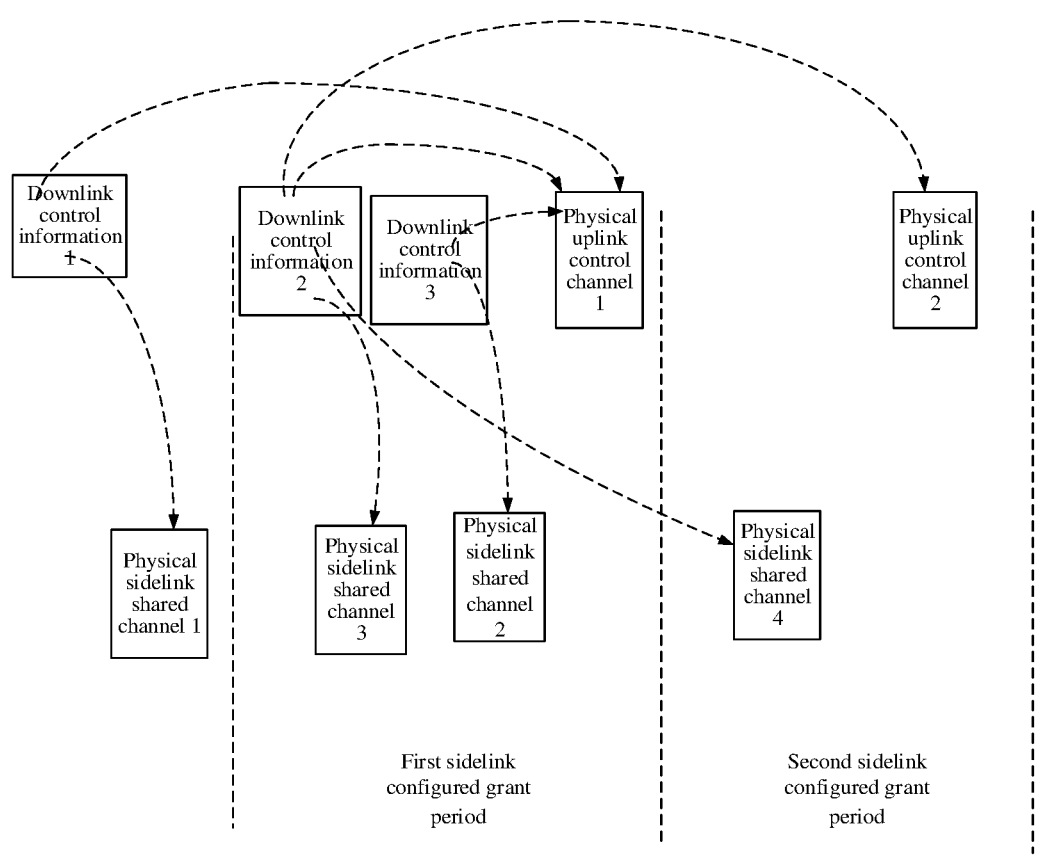
FIG. 14 is a schematic diagram of another application scenario provided by the present disclosure.
Figure 15:
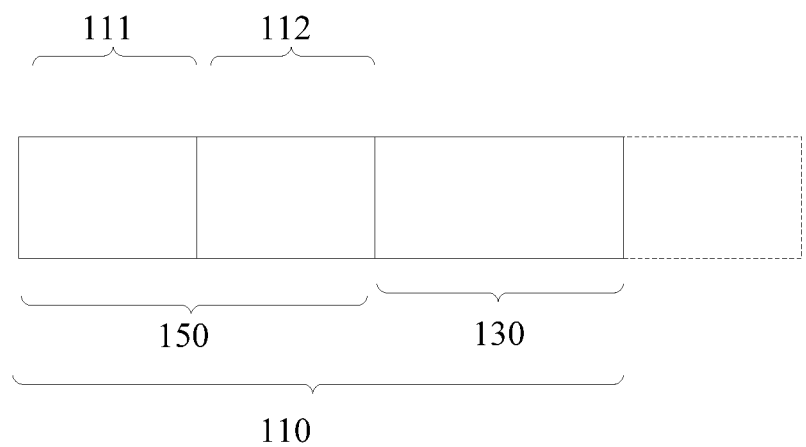
FIG. 15 is a schematic diagram of another first feedback information field provided by the present disclosure.

In still another possible implementation, the multiple sidelink transmission resources are configured by the network device for the first terminal device in the DG mode and the CG mode, and the PUCCH resource configured by the network device for the first terminal device in the DG mode and the PUCCH resource configured by the network device for the first terminal device in the CG mode overlap in the time domain, or are in the same slot, or are the same PUCCH resource. In this case, the terminal device uses one PUCCH to carry the sidelink feedback information corresponding to the sidelink transmission resources allocated in the DG mode and the CG mode. That is to say, one PUCCH needs to reuse the sidelink feedback information corresponding to the sidelink transmission resource configured by the network device in the DG mode and the sidelink feedback information corresponding to the sidelink transmission resource configured by the network device in the CG mode. In this case, the first feedback information field includes a second feedback information field and a third feedback information field. As shown in FIG. 14, the network device configures a PSSCH1 resource and a PUCCH1 resource for the first terminal device in the DG mode through DCI1. The network device configures a PSSCH3 resource and a PUCCH1 resource, as well as a PSSCH4 resource and a PUCCH2 resource, for the first terminal device in the CG mode through DCI2. The PSSCH3 resource and the PUCCH1 resource are in a first SL CG period, and the PSSCH4 resource and the PUCCH2 resource are in a second SL CG period. In addition, the network device also configures a PSSCH2 resource and a PUCCH1 resource for the first terminal device in the DG mode through DCI3. That is to say, the transmission resources corresponding to PSSCH1 and PSSCH2 are the first sidelink transmission resources, the transmission resource corresponding to PSSCH3 is the second sidelink transmission resource, and the sidelink feedback information respectively corresponding to PSSCH1, PSSCH2, and PSSCH3 is carried by PUCCH1. The sidelink feedback information corresponding to PSSCH1 specifically refers to the sidelink feedback information corresponding to the sidelink data sent through PSSCH1. Meanings of the sidelink feedback information respectively corresponding to PSSCH2 and PSSCH3 are similar to the above, and thus will not be repeated here. As shown in FIG. 15, it may be a schematic structural diagram of a first feedback information field included in PUCCH1. Specifically, the first feedback information field includes three subfields. The subfield 111 is used to carry the sidelink feedback information corresponding to PSSCH1, the subfield 112 is used to carry the sidelink feedback information corresponding to PSSCH2, and the subfield 130 is used to carry the sidelink feedback information corresponding to PSSCH3. It may be understood that a correspondence between a subfield and sidelink feedback information as shown in FIG. 15 is only a schematic illustration, and not specifically limited. The subfield 111 and the subfield 112 constitute the second feedback information field 150, and the subfield 130 is the third feedback information field. That is, the second feedback information field may include one or more subfields, and each subfield may carry the sidelink feedback information corresponding to one piece of sidelink data. For example, PSSCH1 carries one piece of sidelink data, and the sidelink data includes two TBs. In the TB-based feedback mode, the subfield 111 includes the 2-bit sidelink feedback information.

In addition, the information carried by one PUCCH may include at most one third feedback information field, and the number of bits of the third feedback information field is determined by the number of pieces of sidelink data that may be transmitted by the second sidelink transmission resource.

For example, as shown in FIG. 14, one SL CG period includes one PSSCH. If the PSSCH includes one TB, in the TB-based feedback mode, the third feedback information field such as the subfield 130 includes 1-bit sidelink feedback information.

For another example, as shown in FIG. 11, one SL CG period includes four PSSCHs. If one PSSCH is used to transmit one piece of sidelink data, and one piece of sidelink data corresponds to two TBs, in the TB-based feedback mode, the third feedback information field such as the subfield 130 may include 8-bit sidelink feedback information.

For another example, as shown in FIG. 11, one SL CG period includes four PSSCHs. If the four PSSCHs are used to transmit the same sidelink data, for example, an initial transmission and retransmission of one piece of sidelink data, and one piece of sidelink data corresponds to two TBs, in the TB-based feedback mode, the third feedback information field such as the subfield 130 may include 2-bit sidelink feedback information.

In addition, on the basis of FIG. 14, one SL CG period may also include multiple PSSCHs. For example, one SL CG period shown in FIG. 11 includes four PSSCHs. In this case, the number of bits in the third feedback information field is similar to the case shown in FIG. 11, which will not be repeated here.

In addition, the sidelink feedback information corresponding to the PSSCHs in different SL CG periods may be carried in different PUCCHs. For example, as shown in FIG. 14, the sidelink feedback information corresponding to PSSCH3 in a first SL CG period may be carried in PUCCH1, and the sidelink feedback information corresponding to PSSCH4 in a second SL CG period may be carried in PUCCH2.

As shown in FIG. 15, the third feedback information field 130 follows the second feedback information field 150, or the third feedback information field 130 may also precede the second feedback information field 150.

As shown in FIG. 15, when the sidelink feedback information reported by the first terminal device to the network device through PUCCH does not include the sidelink feedback information corresponding to the sidelink transmission resource configured based on the CG mode, the first feedback information field 110 does not include the third feedback information field 130, and the number of subfields included in the first feedback information field 110 is the number of pieces of sidelink feedback information corresponding to the sidelink transmission resources configured based on the DG mode.

As shown in FIG. 15, when the sidelink feedback information reported by the first terminal device to the network device through PUCCH does not include the sidelink feedback information corresponding to the sidelink transmission resource configured based on the DG mode, the first feedback information field 110 does not include the second feedback information field 150. In this case, the third feedback information field 130 may be used as a subfield of the first feedback information field 110.

As shown in FIG. 15, when the sidelink feedback information reported by the first terminal device to the network device through PUCCH includes the sidelink feedback information corresponding to the sidelink transmission resource configured based on the DG mode and the sidelink feedback information corresponding to the sidelink transmission resource configured based on the CG mode, the first feedback information field 110 includes the third feedback information field 130 and the second feedback information field 150. In this case, the number of subfields included in the first feedback information field 110 is the number of pieces of sidelink feedback information corresponding to the sidelink transmission resources configured based on the DG mode plus 1.

Optionally, the number of bits of sidelink feedback information corresponding to one piece of sidelink data carried by the third feedback information field is the same as or different from the number of bits of sidelink feedback information corresponding to one piece of sidelink data carried by the second feedback information field. As shown in FIG. 15, the third feedback information field 130 is used to carry the sidelink feedback information corresponding to the second sidelink transmission resource, and the second feedback information field 150 is used to carry the sidelink feedback information corresponding to the first sidelink transmission resource. For example, the third feedback information field 130 is used to carry the sidelink feedback information corresponding to PSSCH3 as shown in FIG. 14, and the subfield 111 is used to carry the sidelink feedback information corresponding to PSSCH1 as shown in FIG. 14. PSSCH1 and PSSCH3 may respectively carry one piece of sidelink data, but the number of TBs included in the sidelink data carried by PSSCH1 may be the same as or different from the number of TBs included in the sidelink data carried by PSSCH3. If the number of TBs carried by PSSCH1 is different from the number of TBs carried by PSSCH3, in the TB-based feedback mode, the number of bits corresponding to the third feedback information field 130 is different from the number of bits corresponding to the subfield 111. If the number of TBs carried by PSSCH1 is the same as the number of TBs carried by PSSCH3, in the TB-based feedback mode, the number of bits corresponding to the third feedback information field 130 is the same as the number of bits corresponding to the subfield 111. The CBG-based feedback mode is similar to the above, and will not be repeated here.

With respect to the above parameters A and B, when one PUCCH may include at most one third feedback information field, the number of bits corresponding to each subfield in the second feedback information field may be determined according to at least one of A_DG and B_DG. The number of bits corresponding to the third feedback information field may be determined according to at least one of A_CG and B_CG. A_DG and B_DG, A_CG and B_CG may be parameters mutually independent to each other. For example, A_DG=2, A_CG=1, B_DG=4. B_CG=2. A_DG and B_DG, A_CG and B_CG may be pre-configured by the network device.

In the communication method provided by embodiments of the present disclosure, one PUCCH is reused for the sidelink feedback information corresponding to the sidelink transmission resource configured by the network device in the DG mode and the sidelink feedback information corresponding to the sidelink transmission resource configured by the network device in the CG mode, thereby further improving the utilization rate of the transmission resource corresponding to the PUCCH.

Based on the above embodiments, as shown in FIG. 10, the network device configures the first terminal device with transmission resources corresponding to PSSCH1, PSSCH2, PSSCH3, and PSSCH4 through DCI1, DCI2, DCI3, and DCI4 in the DG mode, respectively. In addition, the PUCCHs configured by DCI1, DCI2, DCI3, and DCI4 are all PUCCH1. DCI1, DCI2, DCI3 and DCI4 may be carried in different Physical Downlink Control Channels (PDCCHs). In some cases, the first terminal device may not successfully receive one or some of DCI1, DCI2, DCI3, and DCI4. For example, if the first terminal device fails to receive DCI2, the first terminal device will not send the sidelink data on the transmission resource corresponding to PSSCH2 scheduled by DCI2. Similarly, the first terminal device will also not receive the sidelink feedback information corresponding to PSSCH2. In this case, the network device may fail to detect the PUCCH.

In order to solve this problem, embodiments of the present disclosure propose that when the network device configures multiple sidelink transmission resources for the first terminal device in the DG mode, and the multiple sidelink transmission resources correspond to the same PUCCH, the configuration information DCI includes indication information, which is used to determine the number of DCIs that the network device cumulatively sends. Specifically, the indication information is used to indicate the number of DCIs cumulatively sent by the network device when configuring the sidelink transmission resource for the first terminal device in the DG mode. For example, the indication information is specifically a Sidelink Assignment Indicator (SAI). In addition, when the network device configures the sidelink transmission resource for the first terminal device through the type-2 configured grant in the CG mode, the respective DCI may include or may not include the SAI.

Figure 16:
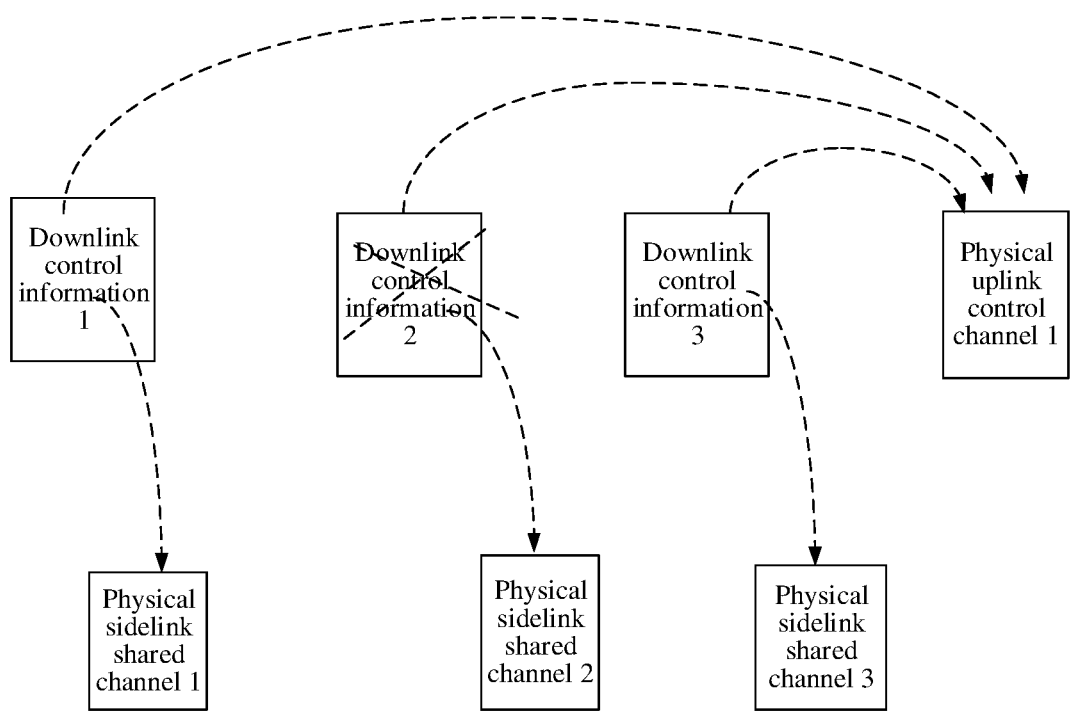
FIG. 16 is a schematic diagram of another application scenario provided by the present disclosure.

As shown in FIG. 16, the network device respectively configures PSSCH1, PSSCH2, and PSSCH3 for the first terminal device through three DCIs, such as DCI1, DCI2, and DCI3. In addition, the PUCCHs configured by the three DCIs, such as DCI1, DCI2, and DCI3, are all PUCCH1. DCI1, DCI2, and DCI3 include one SAI, respectively. For example, a value of SAI in DCI1 is 1, a value of SAI in DCI2 is 2, and a value of SAI in DCI3 is 3. If the first terminal device fails to receive DCI2 but successfully receives DCI1 and DCI3, the first terminal device may determine that the network device has cumulatively sent 3 DCIs according to the maximum value of SAI included in the received DCI1 and DCI3. Further, the first terminal device may determine the un-received DCI according to the number of DCIs cumulatively sent by the network device and the DCI received by the first terminal device. For example, the first terminal device determines that the first terminal device does not receive DCI2 according to the number being 3 of DCIs cumulatively sent by the network device, and the value being 1 of SAI included in DCI1 and the value being 3 of SAI included in DCI3 received by the first terminal device.

Optionally, the number of subfields included in the second feedback information field in PUCCH1 may be determined according to the maximum value of SAI included in the DCI detected by the first terminal device. For example, the maximum value of SAI included in DCI1 and DCI3 received by the first terminal device is 3, and the first terminal device determines that the number of subfields included in the second feedback information field in PUCCH1 is 3. It may be understood that, if the first feedback information field only includes the second feedback information field, the number of subfields included in the first feedback information field is the number of subfields included in the second feedback information field. If the first feedback information field includes the second feedback information field and the third feedback information field, the number of subfields included in the first feedback information field is the number of subfields included in the second feedback information field plus 1. Therefore, the first terminal device may determine the number of subfields included in the first feedback information field according to SAI.

Figure 17:
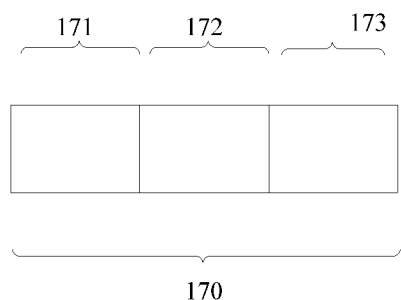
FIG. 17 is a schematic diagram of still another first feedback information field provided by the present disclosure.

Since the first terminal device does not receive DCI2, the first terminal device will not send the sidelink data on PSSCH2 scheduled by DCI2. Similarly, the first terminal device will not receive the sidelink feedback information corresponding to PSSCH2. In embodiments of the present disclosure, the sidelink feedback information corresponding to PSSCH2 may be used as the sidelink feedback information corresponding to DCI2 not received by the first terminal device, and the sidelink feedback information corresponding to DCI2 may also be carried by the second feedback information field in PUCCH1. Specifically, the second feedback information field includes a fourth feedback information field, and the fourth feedback information field is used to carry the sidelink feedback information corresponding to DCI2 not received by the first terminal device. As shown in FIG. 17, 170 denotes the second feedback information field. The second feedback information field 170 includes a subfield 171, a fourth feedback information field 172 and a subfield 173. The subfield 171 is used to carry the sidelink feedback information corresponding to PSSCH1, for example, ACK. The fourth feedback information field 172 is used to carry the sidelink feedback information corresponding to DCI2. Since the first terminal device does not receive the sidelink feedback information corresponding to PSSCH2, the sidelink feedback information corresponding to DCI2 is NACK. The subfield 173 is used to carry the sidelink feedback information corresponding to PSSCH3, for example, ACK. When the network device receives information carried by PUCCH1, it may determine that the sidelink feedback information is NACK according to the fourth feedback information field 172. Therefore, the network device may re-transmit DCI2 to the first terminal device to re-allocate the transmission resource corresponding to PSSCH2 for the first terminal device through DCI2.

In an implementation, the number of bits in the fourth feedback information field is the same as the number of bits in another subfield (e.g., subfield 171 and subfield 173) in the second feedback information field. In the communication method provided by embodiments of the present disclosure, when the network device configures multiple sidelink transmission resources for the first terminal device in the DG mode, and the multiple sidelink transmission resources correspond to the same PUCCH, the configuration information DCI includes indication information, which is used to determine the number of DCIs cumulatively sent by the network device. Thus, the first terminal device may feed back the sidelink feedback information corresponding to the DCI not received by the first terminal device in the PUCCH. Accordingly, when the network device receives the information carried by the PUCCH, it determines the DCI not received by the first terminal device, and re-transmits the DCI to the first terminal device. This helps to avoid a case that when the first terminal device fails to receive DCI, the number of bits of the sidelink feedback information reported through PUCCH is inconsistent with the number of bits of the information expected by the network device, thereby avoiding blind detection of PUCCH when the network device fails to detect PUCCH, and also improving the reliability of the network device configuring the sidelink transmission resource.

On the basis of the above embodiments, when the network device configures the sidelink transmission resource for the first terminal device through type-2 configured grant in the CG mode, the sidelink transmission resource may be activated or deactivated through DCI. In embodiments of the present disclosure, the first terminal device may send feedback information to the network device for the DCI used for activating or deactivating the sidelink transmission resource. If the first terminal device successfully receives the DCI used for activating or deactivating the sidelink transmission resource, the first terminal device sends ACK to the network device. If the first terminal device fails to receive the DCI used for activating or deactivating the sidelink transmission resource, the first terminal device sends NACK to the network device. It may be understood that the DCI used for activating or deactivating the sidelink transmission resource may also configure the transmission resource of PUCCH. The PUCCH is used to carry the feedback information corresponding to the DCI used for activating or deactivating the sidelink transmission resource. If the transmission resource of the PUCCH configured by the DCI used for activating or deactivating the sidelink transmission resource and the transmission resource of the PUCCH used for carrying the sidelink feedback information as described in the above embodiments overlap in the time domain or are in the same slot, then the same PUCCH needs to be reused for the feedback information corresponding to the DCI used for activating or deactivating the sidelink transmission resource and the sidelink feedback information.

For example, on the basis of FIG. 12, the PUCCH may also include other information fields, such as an information field shown by the dotted box. The information field shown by the dotted box may be denoted as a fifth feedback information field, and the fifth feedback information field is used to carry the feedback information for the DCI used for activating or deactivating the sidelink transmission resource and sent by the first terminal device for the network device. For example, the network device activates a sidelink configured grant transmission resource through DCI2, the feedback information for DCI2 by the first terminal device is, for example, ACK, and the PUCCH transmission resource that carries the ACK is PUCCH shown in FIG. 12. Then, the fifth feedback information field of PUCCH may include the feedback information ACK corresponding to DCI2.

As shown in FIG. 12, the fifth feedback information field is subsequent to the first feedback information field 110. In other embodiments, the fifth feedback information field may also precede the first feedback information field 110.

Similarly, on the basis of FIG. 13, FIG. 15, and FIG. 17, the fifth feedback information field may also be included, which will not be described in detail.

Optionally, one PUCCH may include at most one fifth feedback information field.

In the communication method provided by embodiments of the present disclosure, the same PUCCH needs to be reused for the feedback information corresponding to the DCI used to activate or deactivate the sidelink transmission resource and the sideline feedback information, which further improve the utilization rate of the transmission resource corresponding to the PUCCH.

Figure 18:
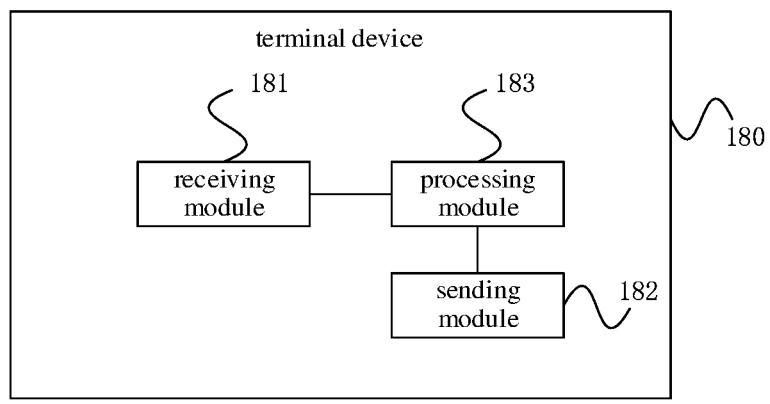
FIG. 18 is a schematic structural diagram of a terminal device provided by the present disclosure.

FIG. 18 is a schematic structural diagram of a terminal device provided by the present disclosure. As shown in FIG. 18, the terminal device 180 includes: a receiving module 181 and a sending module 182.

The receiving module 181 is configured to receive configuration information sent by a network device. The configuration information is used to configure a sidelink transmission resource and a transmission resource corresponding to a Physical Uplink Control Channel (PUCCH).

The sending module 182 is configured to send multiple pieces of sidelink data to another terminal device on the sidelink transmission resource.

The receiving module 181 is further configured to receive sidelink feedback information corresponding to the multiple pieces of sidelink data from the other terminal device.

The sending module 182 is further configured to send the sidelink feedback information to the network device. The sidelink feedback information is carried by the PUCCH.

The terminal device provided in embodiments of the present disclosure is configured to execute the technical solution at the terminal device side in any of the foregoing method embodiments. The implementation principles and technical effects thereof are similar, and details are not repeated here.

Optionally, information carried by the PUCCH includes a first feedback information field, and the first feedback information field is used to carry the sidelink feedback information corresponding to the sidelink data.

Optionally, the sidelink transmission resource includes a first sidelink transmission resource and/or a second sidelink transmission resource. The first sidelink transmission resource is a sidelink transmission resource configured by the network device for the terminal device in a dynamic scheduling mode. The second sidelink transmission resource is a sidelink transmission resource within one sidelink configured grant period configured by the network device for the terminal device in a sidelink configured grant mode.

Optionally, the first feedback information field includes a second feedback information field and/or a third feedback information field. Sidelink feedback information corresponding to sidelink data sent by the terminal device using the first sidelink transmission resource is carried by the second feedback information field. Sidelink feedback information corresponding to sidelink data sent by the terminal device using the second sidelink transmission resource is carried by the third feedback information field.

Optionally, the second feedback information field includes at least one subfield, and each subfield of the at least one subfield is used to carry sidelink feedback information corresponding to one piece of sidelink data.

Optionally, information carried by one PUCCH includes at most one third feedback information field.

Optionally, the number of bits of the third feedback information field is determined by the number of pieces of sidelink data that are transmittable by the second sidelink transmission resource.

Optionally, the third feedback information field is subsequent to the second feedback information field.

Optionally, the third feedback information field precedes the second feedback information field.

Optionally, the sidelink transmission resource includes a transmission resource corresponding to a Physical Sidelink Shared Channel (PSSCH); and the number of bits corresponding to each subfield of the first feedback information field is determined according to at least one of the maximum number of transmission blocks carried by the PSSCH and the maximum number of code block groups included in each transmission block.

Optionally, the number of bits of sidelink feedback information corresponding to one piece of sidelink data carried by the third feedback information field is the same as or different from the number of bits of sidelink feedback information corresponding to one piece of sidelink data carried by the second feedback information field.

Optionally, the first sidelink transmission resource is configured by the network device through downlink control information (DCI). The DCI includes indication information, and the indication information is used to indicate the number of DCIs cumulatively sent by the network device.

Optionally, the indication information being used to indicate the number of DCIs cumulatively sent by the network device includes: the indication information used to indicate the number of DCIs cumulatively sent by the network device when configuring the sidelink transmission resource for the terminal device in the dynamic scheduling mode.

Optionally, the terminal device further includes a processing module 183, and the processing module 183 is configured to determine a DCI that is not received according to the number of DCIs cumulatively sent by the network device and the DCI received by the terminal device. The second feedback information field includes a fourth feedback information field, and sidelink feedback information corresponding to the DCI not received by the terminal device is carried by the fourth feedback information field.

Optionally, the terminal device further includes a processing module 183, and the processing module 183 is configured to determine the number of subfields included in the first feedback information field according to the indication information.

Optionally, the configuration information includes DCI, and the DCI is used to indicate activation or deactivation of the sidelink transmission resource. The PUCCH further includes a fifth feedback information field, and feedback information of the DCI by the terminal device is carried by the fifth feedback information field.

Optionally, the fifth feedback information field is subsequent to the first feedback information field.

Optionally, the fifth feedback information field precedes the first feedback information field.

Figure 19:
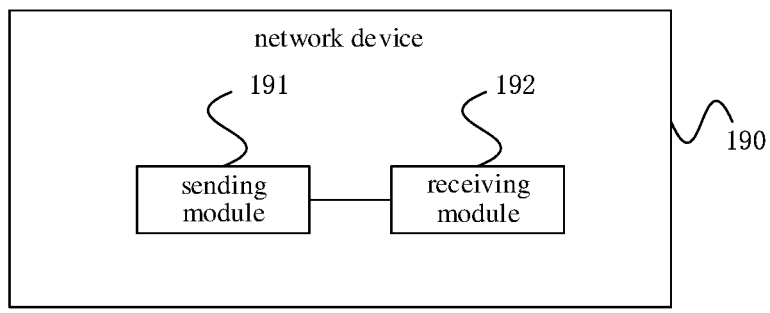
FIG. 19 is a schematic structural diagram of a network device provided by the present disclosure.

FIG. 19 is a schematic structural diagram of a network device provided by the present disclosure. As shown in FIG. 19, the network device 190 includes: a sending module 191 and a receiving module 192.

The sending module 191 is configured to send configuration information to a first terminal device, and the configuration information is used to configure a sidelink transmission resource and a transmission resource corresponding to a Physical Uplink Control Channel (PUCCH).

The receiving module 192 is configured to receive sidelink feedback information from the first terminal device, and the sidelink feedback information is carried by the PUCCH. The sidelink feedback information is sidelink feedback information corresponding to multiple pieces of sidelink data sent by the first terminal device to a second terminal device on the sidelink transmission resource.

The network device provided in embodiments of the present disclosure is configured to execute the technical solution at the network device side in any of the foregoing method embodiments. The implementation principle and technical effects thereof are similar, and details are not repeated here.

Optionally, information carried by the PUCCH includes a first feedback information field, and the first feedback information field is used to carry the sidelink feedback information corresponding to the sidelink data.

Optionally, the sidelink transmission resource includes a first sidelink transmission resource and/or a second sidelink transmission resource. The first sidelink transmission resource is a sidelink transmission resource configured by the network device for the first terminal device in a dynamic scheduling mode. The second sidelink transmission resource is a sidelink transmission resource within one sidelink configured grant period configured by the network device for the first terminal device in a sidelink configured grant mode.

Optionally, the first feedback information field includes a second feedback information field and/or a third feedback information field. Sidelink feedback information corresponding to sidelink data sent by the first terminal device using the first sidelink transmission resource is carried by the second feedback information field. Sidelink feedback information corresponding to sidelink data sent by the first terminal device using the second sidelink transmission resource is carried by the third feedback information field.

Optionally, the second feedback information field includes at least one subfield, and each subfield of the at least one subfield is used to carry sidelink feedback information corresponding to one piece of sidelink data.

Optionally, information carried by one PUCCH includes at most one third feedback information field.

Optionally, the number of bits of the third feedback information field is determined by the number of pieces of sidelink data that are transmittable by the second sidelink transmission resource.

Optionally, the third feedback information field is subsequent to the second feedback information field.

Optionally, the third feedback information field precedes the second feedback information field.

Optionally, the sidelink transmission resource includes a transmission resource corresponding to a Physical Sidelink Shared Channel (PSSCH). The number of bits corresponding to each subfield of the first feedback information field is determined according to at least one of the maximum number of transmission blocks carried by the PSSCH and the maximum number of code block groups included in each transmission block.

Optionally, the number of bits of sidelink feedback information corresponding to one piece of sidelink data carried by the third feedback information field is the same as or different from the number of bits of sidelink feedback information corresponding to one piece of sidelink data carried by the second feedback information field.

Optionally, the first sidelink transmission resource is configured by the network device through downlink control information (DCI). The DCI includes indication information, and the indication information is used to indicate the number of DCIs cumulatively sent by the network device.

Optionally, the indication information being used to indicate the number of DCIs cumulatively sent by the network device includes: the indication information used to indicate the number of DCIs cumulatively sent by the network device when configuring the sidelink transmission resource for the first terminal device in the dynamic scheduling mode.

Optionally, the second feedback information field includes a fourth feedback information field, and sidelink feedback information corresponding to the DCI not received by the first terminal device is carried by the fourth feedback information field.

Optionally, the configuration information includes DCI, and the DCI is used to indicate activation or deactivation of the sidelink transmission resource. The PUCCH further includes a fifth feedback information field, and feedback information of the DCI by the first terminal device is carried by the fifth feedback information field.

Optionally, the fifth feedback information field is subsequent to the first feedback information field.

Optionally, the fifth feedback information field precedes the first feedback information field.

Figure 20:
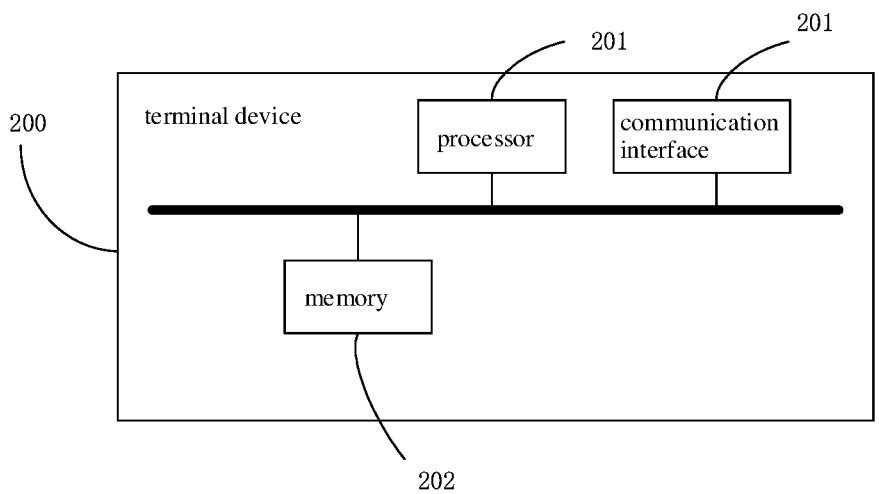
FIG. 20 is another schematic structural diagram of a terminal device provided by the present disclosure.

FIG. 20 is another schematic structural diagram of a terminal device provided by the present disclosure. As shown in FIG. 20, the terminal device 200 includes: a processor 201, a memory 202, and a communication interface 203 for communicating with a network device.

The memory 202 is configured to store computer-executable indications.

The processor 201 is configured to execute the computer-executable indications stored in the memory 202, such that the processor 201 performs the technical solution at the terminal device side in any of the foregoing method embodiments.

FIG. 20 is a simple design of the terminal device. Embodiments of the present disclosure do not limit the number of processors and memories in the terminal device. FIG. 20 only uses one processor and one memory as an example for description.

Figure 21:
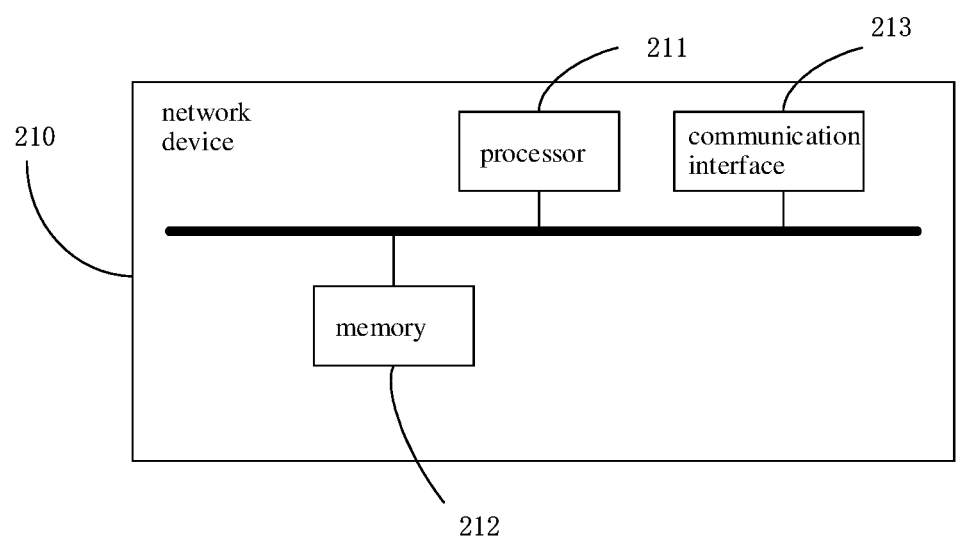
FIG. 21 is another schematic structural diagram of a network device provided by the present disclosure.

FIG. 21 is another schematic structural diagram of a network device provided by the present disclosure. As shown in FIG. 21, the network device 210 includes: a processor 211, a memory 212, and a communication interface 213 for communicating with a terminal device.

The memory 212 is configured to store computer-executable indications.

The processor 211 is configured to execute the computer-executable indications stored in the memory 212, such that the processor 211 performs the technical solution at the network device side in any of the foregoing method embodiments.

FIG. 21 is a simple design of the network device. Embodiments of the present disclosure do not limit the number of processors and memories in the network device. FIG. 21 only uses one processor and one memory as an example for description.

In a specific implementation of the terminal device shown in FIG. 20 and the network device described in FIG. 21, the memory, the processor and the communication interface may be connected by a bus. In an implementation, the memory may be integrated inside the processor.

Embodiments of the present disclosure also provide a computer-readable storage medium in which computer-executable indications are stored. The computer-executable indications are used to implement the communication method in any of the foregoing method embodiments when executed by a processor.

Embodiments of the present disclosure also provide a chip, including: a processor, configured to call and run a computer program from a memory, so that a device installed with the chip performs the communication method described in any of the foregoing method embodiments.

Embodiments of the present disclosure also provide a computer program product, including computer program instructions, and the computer program instructions cause a computer to perform the communication method described in any of the foregoing method embodiments.

Embodiments of the present disclosure also provide a computer program, and the computer program enables a computer to perform the communication method described in any of the foregoing method embodiments.

In some embodiments provided by the present disclosure, it should be understood that the disclosed device and method may be implemented in other ways. For example, the device embodiments described above are merely illustrative. For example, a division of modules is only a logical function division, and there may be other divisions in actual implementations. For example, multiple modules may be combined or integrated into another system; or some features may be ignored or not implemented. In addition, the displayed or discussed mutual coupling or direct coupling or communication connection may be indirect coupling or communication connection through some interfaces and modules, and may be in electrical, mechanical or other forms.

In specific implementations of the foregoing terminal device and network device, it should be understood that a processor may be a central processing unit (CPU), or may be other general-purpose processors, Digital Signal Processor (DSP), Application Specific Integrated Circuit (ASIC), and so forth. The general-purpose processor may be a microprocessor or the processor may also be any conventional processor and so forth. Steps of the method disclosed in the present disclosure may be directly embodied as being executed and completed by a hardware processor, or executed and completed by a combination of hardware and software modules in the processor.

All or part of the steps in the foregoing method embodiments may be implemented by a program indication relevant hardware. The foregoing program may be stored in a readable memory. The program executes the steps including the foregoing method embodiments when executed. The foregoing memory (storage medium) includes: Read-Only Memory (ROM), Random Access Memory (RAM), Flash memory, hard disk, solid state drive, magnetic tape, floppy disk, optical disc and any combination thereof.

What is claimed is:

1. A communication method, comprising:
receiving, by a first terminal device, configuration information sent by a network device, wherein the configuration information is used for configuring a sidelink transmission resource and a transmission resource corresponding to a Physical Uplink Control Channel (PUCCH);
sending, by the first terminal device, multiple pieces of sidelink data to a second terminal device on the sidelink transmission resource;
receiving, by the first terminal device, sidelink feedback information corresponding to the multiple pieces of sidelink data from the second terminal device; and sending, by the first terminal device, the sidelink feedback information to the network device, wherein the sidelink feedback information is carried by the PUCCH, wherein information carried by the PUCCH comprises a first feedback information field, and the first feedback information field is used for carrying the sidelink feedback information corresponding to the sidelink data;

the sidelink transmission resource comprises a first sidelink transmission resource and a second sidelink transmission resource;

the first sidelink transmission resource is a sidelink transmission resource configured by the network device for the first terminal device in a dynamic scheduling mode;

the second sidelink transmission resource is a sidelink transmission resource within one sidelink configured grant period configured by the network device for the first terminal device in a sidelink configured grant mode;

the first feedback information field comprises a second feedback information field and a third feedback information field;

sidelink feedback information corresponding to sidelink data sent by the first terminal device using the first sidelink transmission resource is carried by the second feedback information field;

sidelink feedback information corresponding to sidelink data sent by the first terminal device using the second sidelink transmission resource is carried by the third feedback information field;

information carried by one PUCCH comprises at most one third feedback information field;

the third feedback information field is subsequent to the second feedback information field; and the first sidelink transmission resource is configured by the network device through downlink control information (DCI), the DCI comprises indication information, and the indication information is used for indicating the number of DCIs cumulatively sent by the network device.

2. The method according to claim 1, wherein the second feedback information field comprises at least one subfield, and each subfield of the at least one subfield is used for carrying sidelink feedback information corresponding to one piece of sidelink data.

3. The method according to claim 1, wherein
the sidelink transmission resource comprises a transmission resource corresponding to a Physical Sidelink Shared Channel (PSSCH); and
the number of bits corresponding to each subfield of the first feedback information field is determined according to at least one of the maximum number of transmission blocks carried by the PSSCH and the maximum number of code block groups comprised in each transmission block.

4. The method according to claim 1, wherein the indication information is used for indicating the number of DCIs cumulatively sent by the network device when configuring a sidelink transmission resource for the first terminal device in a dynamic scheduling mode.

5. The method according to claim 1, wherein
the method further comprises:
determining, by the first terminal device, a DCI that is not received according to the number of DCIs cumulatively sent by the network device and a DCI received by the first terminal device; and the second feedback information field comprises a fourth feedback information field, and sidelink feedback information corresponding to the DCI not received by the first terminal device is carried by the fourth feedback information field.

6. The method according to claim 1, wherein the method further comprises:
determining, by the first terminal device, the number of subfields comprised in the first feedback information field according to the indication information.

7. A communication method, comprising:
sending, by a network device, configuration information to a first terminal device, wherein the configuration information is used for configuring a sidelink transmission resource and a transmission resource corresponding to a Physical Uplink Control Channel (PUCCH); and receiving, by the network device, sidelink feedback information from the first terminal device, wherein the sidelink feedback information is carried by the PUCCH, and the sidelink feedback information is sidelink feedback information corresponding to multiple pieces of sidelink data sent by the first terminal device to a second terminal device on the sidelink transmission resource, wherein information carried by the PUCCH comprises a first feedback information field, and the first feedback information field is used for carrying the sidelink feedback information corresponding to the sidelink data;

the sidelink transmission resource comprises a first sidelink transmission resource and a second sidelink transmission resource;

the first sidelink transmission resource is a sidelink transmission resource configured by the network device for the first terminal device in a dynamic scheduling mode;

the second sidelink transmission resource is a sidelink transmission resource within one sidelink configured grant period configured by the network device for the first terminal device in a sidelink configured grant mode;

the first feedback information field comprises a second feedback information field and a third feedback information field;

sidelink feedback information corresponding to sidelink data sent by the first terminal device using the first sidelink transmission resource is carried by the second feedback information field;

sidelink feedback information corresponding to sidelink data sent by the first terminal device using the second sidelink transmission resource is carried by the third feedback information field;

information carried by one PUCCH comprises at most one third feedback information field;

the third feedback information field is subsequent to the second feedback information field; and the first sidelink transmission resource is configured by the network device through downlink control information (DCI), the DCI comprises indication information, and the indication information is used for indicating the number of DCIs cumulatively sent by the network device.

8. The method according to claim 7, wherein the second feedback information field comprises at least one subfield, and each subfield of the at least one subfield is used for carrying sidelink feedback information corresponding to one piece of sidelink data.

9. The method according to claim 7, wherein
the sidelink transmission resource comprises a transmission resource corresponding to a Physical Sidelink Shared Channel (PSSCH); and
the number of bits corresponding to each subfield of the first feedback information field is determined according to at least one of the maximum number of transmission blocks carried by the PSSCH and the maximum number of code block groups comprised in each transmission block.

10. The method according to claim 7, wherein the indication information is used for indicating the number of DCIs cumulatively sent by the network device when configuring a sidelink transmission resource for the first terminal device in a dynamic scheduling mode.

11. The method according to claim 7, wherein
the second feedback information field comprises a fourth feedback information field, and sidelink feedback information corresponding to the DCI not received by the first terminal device is carried by the fourth feedback information field.

12. A terminal device, comprising:
a processor, a memory, and an interfaces configured for communicating with a network device, wherein
the memory is configured to store computer-executable instructions; and
the computer-executable instructions stored in the memory are configured to be executed by the processor, so that the processor is enabled to perform a communication method, comprising:
receiving configuration information sent by a network device, wherein the configuration information is used for configuring a sidelink transmission resource and a transmission resource corresponding to a Physical Uplink Control Channel (PUCCH);
sending multiple pieces of sidelink data to another terminal device on the sidelink transmission resource;
receiving sidelink feedback information corresponding to the multiple pieces of sidelink data from the other terminal device; and
sending the sidelink feedback information to the network device, wherein the sidelink feedback information is carried by the PUCCH, wherein
information carried by the PUCCH comprises a first feedback information field, and the first feedback information field is used for carrying the sidelink feedback information corresponding to the sidelink data;
the sidelink transmission resource comprises a first sidelink transmission resource and a second sidelink transmission resource;
the first sidelink transmission resource is a sidelink transmission resource configured by the network device for the first terminal device in a dynamic scheduling mode;
the second sidelink transmission resource is a sidelink transmission resource within one sidelink configured grant period configured by the network device for the first terminal device in a sidelink configured grant mode;
the first feedback information field comprises a second feedback information field and a third feedback information field;
sidelink feedback information corresponding to sidelink data sent by the first terminal device using the first sidelink transmission resource is carried by the second feedback information field;
sidelink feedback information corresponding to sidelink data sent by the first terminal device using the second sidelink transmission resource is carried by the third feedback information field;
information carried by one PUCCH comprises at most one third feedback information field;
the third feedback information field is subsequent to the second feedback information field; and
the first sidelink transmission resource is configured by the network device through downlink control information (DCI), the DCI comprises indication information, and the indication information is used for indicating the number of DCIs cumulatively sent by the network device.

13. The terminal device according to claim 12, wherein the second feedback information field comprises at least one subfield, and each subfield of the at least one subfield is used for carrying sidelink feedback information corresponding to one piece of sidelink data.

14. The terminal device according to claim 12, wherein
the sidelink transmission resource comprises a transmission resource corresponding to a Physical Sidelink Shared Channel (PSSCH); and
the number of bits corresponding to each subfield of the first feedback information field is determined according to at least one of the maximum number of transmission blocks carried by the PSSCH and the maximum number of code block groups comprised in each transmission block.

15. The terminal device according to claim 12, wherein the indication information is used for indicating the number of DCIs cumulatively sent by the network device when configuring a sidelink transmission resource for the first terminal device in a dynamic scheduling mode.

16. The terminal device according to claim 12, wherein the method further comprises:
determining, by the first terminal device, a DCI that is not received according to the number of DCIs cumulatively sent by the network device and a DCI received by the first terminal device; and
the second feedback information field comprises a fourth feedback information field, and sidelink feedback information corresponding to the DCI not received by the first terminal device is carried by the fourth feedback information field.

17. The terminal device according to claim 12, wherein the method further comprises:
determining, by the first terminal device, the number of subfields comprised in the first feedback information field according to the indication information.

* * * * *